(12) United States Patent
Andrijanic et al.

(10) Patent No.: US 9,877,033 B2
(45) Date of Patent: Jan. 23, 2018

(54) TEMPORAL AND SPATIAL VIDEO BLOCK REORDERING IN A DECODER TO IMPROVE CACHE HITS

(75) Inventors: Vladan Andrijanic, San Diego, CA (US); Serag GadelRab, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 12/643,523

(22) Filed: Dec. 21, 2009

(65) Prior Publication Data

US 2011/0150085 A1    Jun. 23, 2011

(51) Int. Cl.
| | |
|---|---|
| *H04N 7/32* | (2006.01) |
| *H04N 19/433* | (2014.01) |
| *H04N 19/176* | (2014.01) |
| *H04N 19/51* | (2014.01) |
| *H04N 19/102* | (2014.01) |
| *H04N 19/137* | (2014.01) |
| *H04N 19/44* | (2014.01) |

(52) U.S. Cl.
CPC ......... *H04N 19/433* (2014.11); *H04N 19/102* (2014.11); *H04N 19/137* (2014.11); *H04N 19/176* (2014.11); *H04N 19/44* (2014.11); *H04N 19/51* (2014.11)

(58) Field of Classification Search
None
See application file for complete search history.

(56) References Cited

U.S. PATENT DOCUMENTS

| | | | |
|---|---|---|---|
| 6,256,045 B1 * | 7/2001 | Bae et al. | 348/445 |
| 6,687,298 B1 * | 2/2004 | Ikekawa | 375/240.15 |

(Continued)

FOREIGN PATENT DOCUMENTS

| | | |
|---|---|---|
| CN | 101243690 A | 8/2008 |
| EP | 2104356 A1 | 9/2009 |

(Continued)

OTHER PUBLICATIONS

B. Shen et al., "Adaptive Motion-Vector Resampling for Compressed Video Downscaling," IEEE Transactions on Circuits and Systems for Video Technology, vol. 9, No. 6, Sep. 1999, pp. 929-936.

(Continued)

*Primary Examiner* — Edemio Navas, Jr.
(74) *Attorney, Agent, or Firm* — Knobbe, Martens, Olson & Bear, LLP

(57) ABSTRACT

This disclosure describes techniques in which the decoding order of video blocks is modified relative to the display order of video blocks. The decoding order may be modified temporally such that video blocks of different video frames (or other coded units) are decoded in an alternating manner. In this case, the decoding order of video blocks may alternate between video blocks of two or more different frames. Furthermore, the decoding order may also be modified spatially within a given video block such that the video blocks are decoded in an order that does not correspond to the raster scan order of the video blocks. The techniques may improve the use of memory by improving the likelihood of cache hits, thereby reducing the number of memory loads from an external memory to an internal cache associated with the decoder.

36 Claims, 11 Drawing Sheets

(56) References Cited

U.S. PATENT DOCUMENTS

| | | | |
|---|---|---|---|
| 7,715,479 B2* | 5/2010 | Lu et al. | 375/240.16 |
| 7,859,574 B1* | 12/2010 | Alvarez | H04N 19/176 348/220.1 |
| 2004/0190615 A1* | 9/2004 | Abe et al. | 375/240.15 |
| 2004/0264570 A1* | 12/2004 | Kondo et al. | 375/240.16 |
| 2005/0094728 A1* | 5/2005 | Frimout et al. | 375/240.12 |
| 2005/0278635 A1 | 12/2005 | Zhu et al. | |
| 2007/0025444 A1* | 2/2007 | Okada et al. | 375/240.16 |
| 2007/0206675 A1* | 9/2007 | Tanaka | 375/240.12 |
| 2008/0049845 A1 | 2/2008 | Liu | |
| 2009/0146058 A1 | 6/2009 | Dane et al. | |
| 2009/0154559 A1* | 6/2009 | Gardner | 375/240.14 |
| 2009/0279801 A1* | 11/2009 | Ohmiya et al. | 382/238 |
| 2010/0027663 A1* | 2/2010 | Dai et al. | 375/240.16 |
| 2010/0215104 A1* | 8/2010 | Osamoto et al. | 375/240.16 |
| 2010/0284468 A1* | 11/2010 | Hayashi | 375/240.16 |

FOREIGN PATENT DOCUMENTS

| | | |
|---|---|---|
| JP | 2000278693 A | 10/2000 |
| WO | WO2007020560 A1 | 2/2007 |
| WO | 2008038513 A1 | 4/2008 |

OTHER PUBLICATIONS

A. Azevedo et al., "Parallel H.264 Decoding on an Embedded Multicore Processor," http://portal.acm.org/citation.cfm?id=1505854, 15 pages, 2008.

Yi-Hau Chen et al., "Frame-Parallel Design Strategy for High Definition B-Frame H.264/AVC Encoder," IEEE, 4 pages, 2008.

Daniel F Finchelstein, et al., "Multicore Processing and Efficient On-Chip Caching for H.264 and Future Video Decoders", IEEE Transactions on Circuits and Systems for Video Technology, IEEE Service Center, Piscataway, NJ, US, vol. 19, No. 11, Nov. 1, 2009 (Nov. 1, 2009), pp. 1704-1713, XP011275986 ISSN: 1051-8215 DOI: DOI:10.1109/TCSVT.2009.2031459.

Feng et al., "Improving Data Caching for Software MPEG Video Decompression", Proceedings of the SPIE, SPIE, Bellingham, VA, US, vol. 2668, Jan. 31, 1996, pp. 94-104, XP000617098.

International Search Report and Written Opinion—PCT/US2010/061368, International Search Authority—European Patent Office—Mar. 29, 2011.

Moccagatta: "ASO & FMO Impact on AVC Compliance and Complexity" ITU Study Group 16—Video Coding Experts Group—ISO/IEC MPEG & ITU-T VCEG(ISO/IEC JTC1/SC29/WG11 and ITU-T SG16 Q6), XX, XX, No. JVT-D115, Jul. 26, 2002 (Jul. 26, 2002), XP030005387.

Group 16—Video Coding Experts Group—ISO/IEC MPEG & ITU-T VCEG(ISO/IEC JTC1/SC29/WG11 And ITU-T SG16 Q6), XX, XX, No. JVT-D115, Jul. 26, 2002 (Jul. 26, 2002), XP030005387.

Azevedo, et al., "Parallel H.264 Decoding on an Embedded Multicore Processor", in High Performance Embedded Architecture and Compliers Lecture Notes, in Computer Science, vol. 5409, 2009, pp. 404-418, Jan. 25, 2009.

Taiwan Search Report—TW099145079—TIPO—Sep. 6, 2013.

* cited by examiner

| VB 1 | VB 2 | VB 3 | VB 4 | VB 5 | VB 6 | VB 7 | VB 8 |
|---|---|---|---|---|---|---|---|
| VB 9 | VB 10 | VB 11 | VB 12 | VB 13 | VB 14 | VB 15 | VB 16 |
| VB 17 | VB 18 | VB 19 | VB 20 | VB 21 | VB 22 | VB 23 | VB 24 |
| VB 25 | VB 26 | VB 27 | VB 28 | VB 29 | VB 30 | VB 31 | VB 32 |
| VB 33 | VB 34 | VB 35 | VB 36 | VB 37 | VB 38 | VB 39 | VB 40 |
| VB 41 | VB 42 | VB 43 | VB 44 | VB 45 | VB 46 | VB 47 | VB 48 |
| VB 49 | VB 50 | VB 51 | VB 52 | VB 53 | VB 54 | VB 55 | VB 56 |
| VB 57 | VB 58 | VB 59 | VB 60 | VB 61 | VB 62 | VB 63 | VB 64 |

FIG. 5

Unit 2

| VB 1 | VB 2 | VB 3 | VB 4 | VB 5 | VB 6 | VB 7 | VB 8 |
|---|---|---|---|---|---|---|---|
| VB 9 | VB 10 | VB 11 | VB 12 | VB 13 | VB 14 | VB 15 | VB 16 |
| VB 17 | VB 18 | VB 19 | VB 20 | VB 21 | VB 22 | VB 23 | VB 24 |
| VB 25 | VB 26 | VB 27 | VB 28 | VB 29 | VB 30 | VB 31 | VB 32 |
| VB 33 | VB 34 | VB 35 | VB 36 | VB 37 | VB 38 | VB 39 | VB 40 |
| VB 41 | VB 42 | VB 43 | VB 44 | VB 45 | VB 46 | VB 47 | VB 48 |
| VB 49 | VB 50 | VB 51 | VB 52 | VB 53 | VB 54 | VB 55 | VB 56 |
| VB 57 | VB 58 | VB 59 | VB 60 | VB 61 | VB 62 | VB 63 | VB 64 |

Unit 1

| VB 1 | VB 2 | VB 3 | VB 4 | VB 5 | VB 6 | VB 7 | VB 8 |
|---|---|---|---|---|---|---|---|
| VB 9 | VB 10 | VB 11 | VB 12 | VB 13 | VB 14 | VB 15 | VB 16 |
| VB 17 | VB 18 | VB 19 | VB 20 | VB 21 | VB 22 | VB 23 | VB 24 |
| VB 25 | VB 26 | VB 27 | VB 28 | VB 29 | VB 30 | VB 31 | VB 32 |
| VB 33 | VB 34 | VB 35 | VB 36 | VB 37 | VB 38 | VB 39 | VB 40 |
| VB 41 | VB 42 | VB 43 | VB 44 | VB 45 | VB 46 | VB 47 | VB 48 |
| VB 49 | VB 50 | VB 51 | VB 52 | VB 53 | VB 54 | VB 55 | VB 56 |
| VB 57 | VB 58 | VB 59 | VB 60 | VB 61 | VB 62 | VB 63 | VB 64 |

FIG. 7

TEMPORAL AND SPATIAL VIDEO BLOCK REORDERING IN A DECODER TO IMPROVE CACHE HITS

TECHNICAL FIELD

This disclosure relates to block-based digital video coding used to compress and decompress video data and, more particularly, techniques for efficiently processing video blocks so as to substantially maximize cache hits and to reduce memory loads to the cache.

BACKGROUND

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or ITU-T H.264/MPEG-4, Part 10, Advanced Video Coding (AVC), to transmit and receive digital video more efficiently. Video compression techniques perform spatial and temporal prediction to reduce or remove redundancy inherent in video sequences.

Block-based video compression techniques may perform spatial prediction and/or temporal prediction. Intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to essentially track movement of corresponding video blocks of two or more temporally adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data from a previous or subsequent coded unit, while in the case of intra-coding, the prediction mode can be used to generate the predictive block based on data within the coded unit associated with the video block being coded. Both intra-coding and inter-coding may define several different prediction modes, each of which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise the use of discrete cosine transforms (DCTs) or conceptually similar processes, such as wavelet transforms, integer transforms, or other types of transforms. In a DCT process, as an example, the transform process converts a set of residual pixel values into transform coefficients, which may represent the energy of the residual pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

SUMMARY

This disclosure describes techniques in which the decoding order of video blocks is modified relative to the display order of video blocks. The decoding order may be modified temporally such that video blocks of different video frames (or other coded units) are decoded in parallel, with the decoding order of video blocks of the different frames being alternated or interleaved. In particular, the decoding order of video blocks may alternate between video blocks of two or more different frames. Furthermore, the decoding order may also be modified spatially within a given video block such that the video blocks are decoded in an order that does not correspond to the raster scan order of the video blocks. The techniques may improve the use of memory by improving the likelihood of cache hits in the decoder, thereby reducing the number of memory loads from an external memory to an internal cache associated with the decoder. The decoding order may be specifically defined in a manner that promotes the likelihood that predictive data already stored in the cache will be needed and used in the decoding, and may reduce memory loads from the external memory to the internal cache during the decoding process.

In one example, this disclosure describes a method of decoding video data. The method comprises receiving a sequence of video units in a decoder, wherein the sequence defines a display order of the video units, and identifying, via the decoder, a subset of the video units that cannot be interdependent. The method may also comprise loading predictive data from a memory to a cache, wherein the cache is associated with the decoder, and decoding video blocks of the subset of encoded video units based at least in part on the predictive data in the cache, wherein decoding the video blocks includes defining a decoding order in which at least some video blocks of a second video unit are decoded before at least some video blocks of a first video unit, wherein the second video unit occurs after the first video unit in the display order.

In another example, this disclosure describes an apparatus that decodes video data, the apparatus comprising a video decoder and an associated cache. The video decoder is configured to receive a sequence of video units, wherein the sequence defines a display order of the video units. The video decoder is also configured to identify a subset of the video units that cannot be interdependent, load predictive data from a memory to the cache, and decode video blocks of the subset of encoded video units based at least in part on the predictive data in the cache. Furthermore, in decoding the video blocks, the decoder defines a decoding order in which at least some video blocks of a second video unit are decoded before at least some video blocks of a first video unit, wherein the second video unit occurs after the first video unit in the display order.

In another example, this disclosure describes a device that decodes video data, the device comprising means for receiving a sequence of video units wherein the sequence defines a display order of the video units, means for identifying a subset of the video units that cannot be interdependent, means for loading predictive data from a memory to a cache, and means for decoding video blocks of the subset of encoded video units based at least in part on the predictive data in the cache, wherein the means for decoding the video blocks includes means for defining a decoding order in which at least some video blocks of a second video unit are decoded before at least some video blocks of a first video unit, wherein the second video unit occurs after the first video unit in the display order.

The techniques described in this disclosure may be implemented in hardware, software, firmware, or any combination thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor cause the processor to upon receiving a sequence of video units, wherein the sequence defines a display order of the video units, identify a subset of the video units that cannot be interdependent, load predictive data from a memory to a cache, and decode video blocks of the subset of encoded video units based at least in part on the predictive data in the cache. In decoding the video blocks, the instructions cause the processor to define a decoding order in which at least some video blocks of a second video unit are decoded before at least some video blocks of a first video unit, wherein the second video unit occurs after the first video unit in the display order.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 5 is a conceptual diagram illustrating a unit of video blocks, such as a video frame, that may be decoded in a decoding order that differs from a raster scan order of the video blocks.

FIG. 7 is a conceptual diagram illustrating two different units of video blocks, such as video frames, that may be decoded in parallel.

DETAILED DESCRIPTION

This disclosure describes techniques in which the decoding order of video blocks is modified relative to the display order of the video blocks. The decoding order may be modified temporally such that video blocks of different video frames (or other coded units) are decoded in parallel, with the decoding order of video blocks of the different frames being alternated or interleaved. In particular, the decoding order of video blocks may alternate between video blocks of two or more different frames. Furthermore, the decoding order may also be modified spatially within a given video block such that the video blocks are decoded in a decoding order that does not correspond to the raster scan order of the video blocks.

The techniques may include loading predictive data from a memory to a cache, wherein the cache is associated with the decoder. The decoding order of video blocks may be defined in a manner that promotes use of the data loaded into the cache, and reduces the need to perform additional memory to cache re-loads until the data in the cache is used for any predictive decoding that relies on the data in the cache. In this way, the techniques may improve the use of memory by improving the likelihood of cache hits, thereby reducing the number of memory loads from an external memory to an internal cache associated with the decoder.

The decoding order may be specifically defined in a manner that promotes the likelihood that predictive data already stored in the cache will be needed and used in the decoding, and may reduce memory loads from the external memory to the internal cache during the decoding process. The techniques may use a statistical metric, such as a global motion metric that quantifies average motion across at least a portion of the sequence of video units. In another example, the statistical metric may comprise an average motion metric that quantifies average motion of video blocks between the first video unit and the second video unit. In any case, the decoding order may be defined at least in part on the statistical metric so as to improve the likelihood of cache hits in the decoding process without requiring memory to cache reloads of data.

Figure 1:
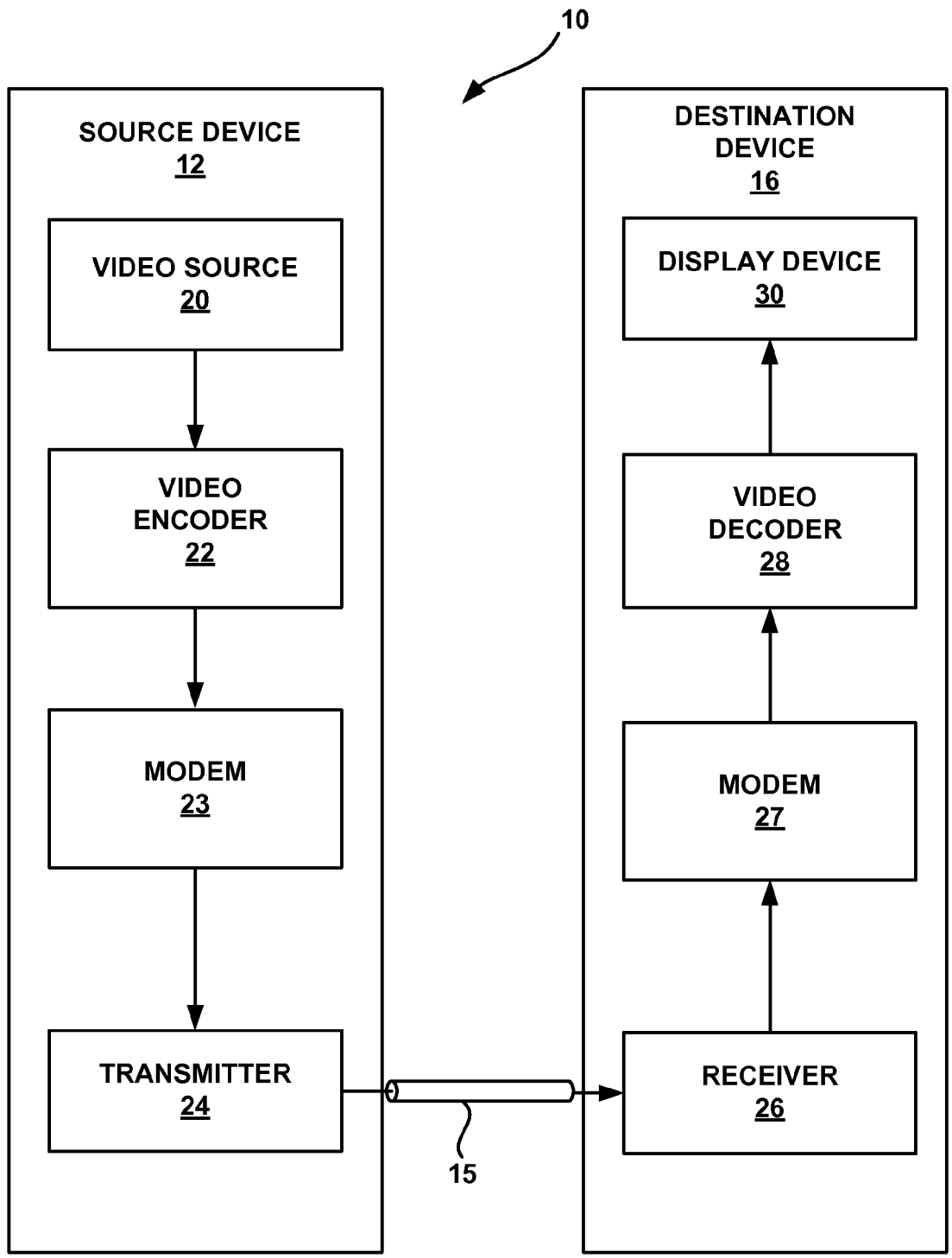
FIG. 1 is an exemplary block diagram illustrating an exemplary video encoding and decoding system.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply more generally to video decoding, are not necessarily limited to wireless applications or settings, and may be applied to non-wireless devices including video decoding capabilities, such as computers, gaming consoles, television set-top boxes, multimedia players, displays, or the like.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. Video encoder 22 of source device 12 may encode video data received from video source 20. Video source 20 may comprise a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA) or another communication standard or technique, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. The video decoding process performed by video decoder 28 may implement the techniques of this disclosure in order to improve memory usage during the decoding process. Specifically, video decoder 28 may implement temporal video block reordering, and possibly spatial video block reordering, in a manner that promotes the use of data stored in an internal cache of decoder 28. In doing so, decoder may help to minimize the amount of memory loads from an external memory (not shown in FIG. 1) to the internal cache of decoder 28.

Video decoder 28 decodes the video blocks according to a block-based predictive encoding technique or standard, such as ITU-T H.264/AVC or another standard. The decoded video blocks can then be assembled into video frames to form decoded video data. Display device 28 displays the decoded video data to a user, and may comprise any of a variety of display devices such as a cathode ray tube (CRT), a liquid crystal display (LCD), a plasma display, an organic light emitting diode (OLED) display, or another type of display device.

Communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16.

Video encoder 22 and video decoder 28 may operate reciprocally according to a video compression standard such as the ITU-T H.264/AVC standard. The ITU-T H.264 standard is also described in MPEG-4, Part 10, Advanced Video Coding (AVC). The techniques of this disclosure are not limited to any specific standard, however, and may be readily applied to any of a variety of other video coding standards or techniques.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

The techniques of this disclosure specifically apply during the decoding process implemented by video decoder 28. Specifically, video decoder 28 may execute decoding techniques that reorder video blocks of decodable units, such as video frames. More generally, frames, slices, portions of frames, groups of pictures (GOPs), or other data structures may be defined as independently decodable units that each include a plurality of video blocks. In some cases, each video frame may include a series of independently decodable slices, and each slice may include a series of macroblocks, which may be arranged into even smaller blocks. The terms "coded unit" and "video unit" refer to frames, slices, portions of frames, groups of pictures (GOPs), or other data structures that are independently decodable. The video blocks within coded units may have fixed or varying sizes, and may differ in size according to a specified coding standard. Syntax data may be defined on a per-coded-unit basis such that each coded unit includes associated syntax data.

Video blocks may comprise so-called macroblocks, or other sized blocks of video data. Macroblocks typically refer to 16 by 16 blocks of data. The ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. A macroblock may refer to a set of chroma and luma blocks that collectively define a 16 by 16 are of pixels. Chroma video blocks are often downsampled, and luma blocks may assume varying sizes. In this disclosure, the phrase "video block" refers to any size of video block. Video blocks may refer to chroma blocks, luma blocks, or possibly set of chroma and luma blocks that collectively form macroblocks. Moreover, video blocks may refer to blocks of video data in the pixel domain, or blocks of data in a transform domain such as a discrete cosine transform (DCT) domain, a domain similar to DCT, a wavelet domain, or the like.

Video encoder 22 may perform predictive coding in which a video block being coded is compared to a predictive frame (or other coded unit) in order to identify a predictive block. The differences between the current video block being coded and the predictive block are coded as a residual block, and prediction syntax is used to identify the predictive block. The residual block may be transformed and quantized. Transform techniques may comprise a DCT process or conceptually similar process, integer transforms, wavelet transforms, or other types of transforms. In a DCT process, as an example, the transform process converts a set of pixel values into transform coefficients, which may represent the energy of the pixel values in the frequency domain. Quantization is typically applied to the transform coefficients, and generally involves a process that limits the number of bits associated with any given transform coefficient.

Following transform and quantization, entropy coding may be performed on the quantized and transformed residual video blocks. Syntax elements, such as the filter information and prediction vectors defined during the encoding, may also be included in the entropy coded bitstream for each coded unit. In general, entropy coding comprises one or more processes that collectively compress a sequence of quantized transform coefficients and/or other syntax information. Scanning techniques, such as zig-zag scanning techniques, are performed on the quantized transform coefficients, e.g., as part of the entropy coding process, in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As mentioned, the techniques of this disclosure specifically apply to the decoding process performed by video decoder 28. In particular, as mentioned, video decoder 28 may implement temporal video block reordering, and possibly spatial video block reordering in a manner that promotes the use of data stored in an internal cache of decoder 28. In order to help appreciate the decoding process, FIG. 2 is described in order to first explain an exemplary encoding process.

Figure 2:
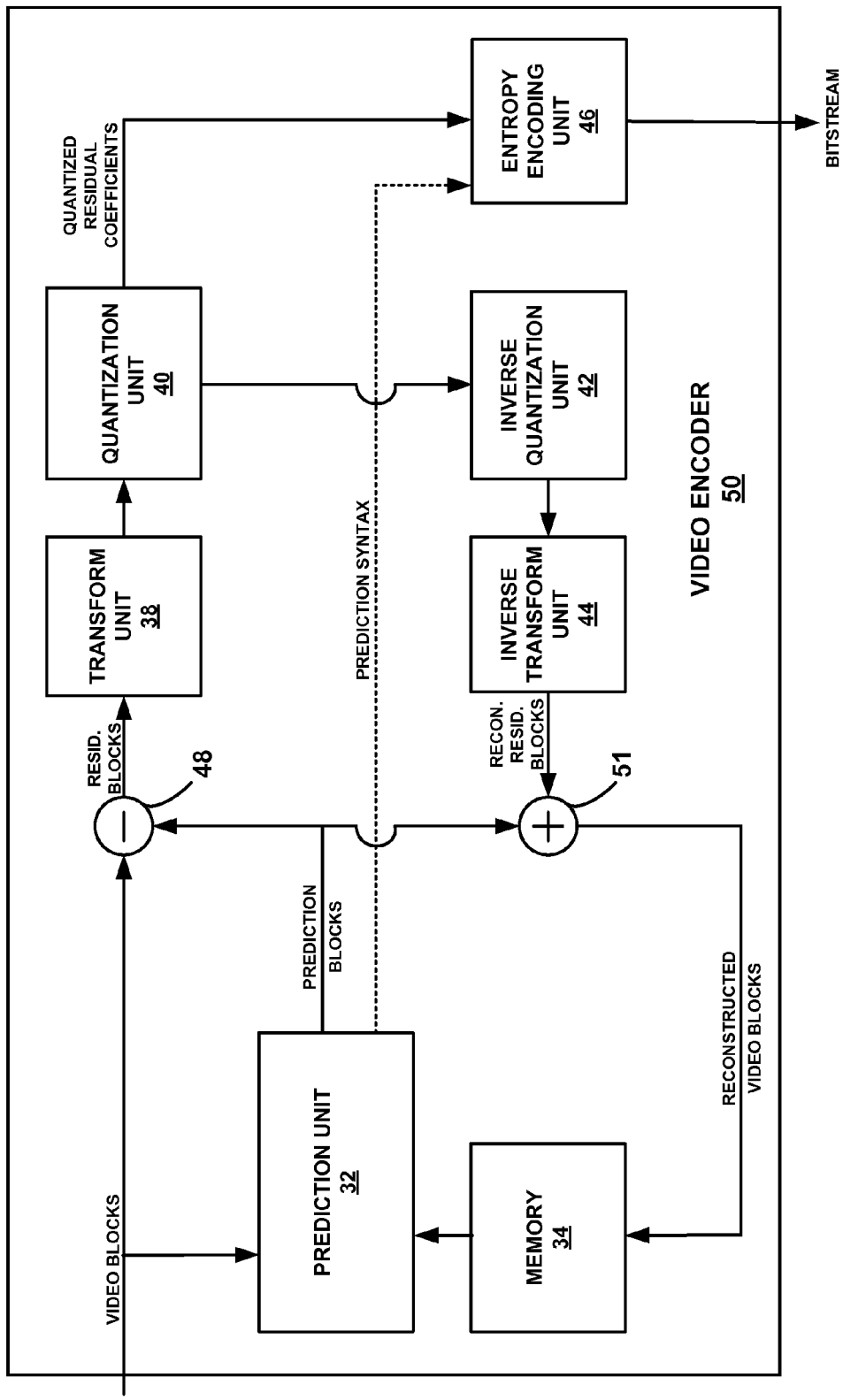
FIG. 2 is a block diagram illustrating an exemplary video encoder.

FIG. 2 is a block diagram illustrating a video encoder 50 consistent with this disclosure. Video encoder 50 may correspond to video encoder 22 of device 20, or a video encoder of a different device. As shown in FIG. 2, video encoder 50 includes a prediction unit 32, adders 48 and 51, and a memory 34. Video encoder 50 also includes a transform unit 38 and a quantization unit 40, as well as an inverse quantization unit 42 and an inverse transform unit 44. Video encoder 50 also includes an entropy coding unit 46. One or more filters (not shown) may also be implemented in the encoding process.

During the encoding process, video encoder 50 receives a video block to be coded, and prediction unit 32 performs predictive coding techniques. For inter coding, prediction unit 32 compares the video block to be encoded to various blocks in one or more video reference frames or slices in order to define a predictive block. For intra coding, prediction unit 32 generates a predictive block based on neighboring data within the same coded unit. Prediction unit 32 outputs the prediction block and adder 48 subtracts the prediction block from the video block being coded in order to generate a residual block.

For inter coding, prediction unit 32 may comprise motion estimation and motion compensation units that identify a motion vector that points to a prediction block and generates the prediction block based on the motion vector. Typically, motion estimation is considered the process of generating the motion vector, which estimates motion. For example, the motion vector may indicate the displacement of a predictive block within a predictive frame relative to the current block being coded within the current frame. Motion compensation is typically considered the process of fetching or generating the predictive block based on the motion vector determined by motion estimation. For intra coding, prediction unit 32 generates a predictive block based on neighboring data within the same coded unit. One or more intra-prediction modes may define how an intra prediction block can be defined.

After prediction unit 32 outputs the prediction block and adder 48 subtracts the prediction block from the video block being coded in order to generate a residual block, transform unit 38 applies a transform to the residual block. The transform may comprise a discrete cosine transform (DCT) or a conceptually similar transform such as that defined by the H.264 standard. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 then quantizes the residual transform coefficients to further reduce bit rate. Quantization unit 40, for example, may limit the number of bits used to code each of the coefficients. After quantization, entropy coding unit 46 scans the quantized coefficient block from a two-dimensional representation to one or more serialized one-dimensional vectors. The scan order may be pre-programmed to occur in a defined order (such as zig-zag scanning or another pre-defined order), or possibly adaptive defined based on previous coding statistics.

Following this scanning process, entropy encoding unit 46 encodes the quantized transform coefficients (along with any syntax elements) according to an entropy coding methodology, such as CAVLC or CABAC, to further compress the data. Syntax elements included in the entropy coded bitstream may include prediction syntax from prediction unit 32, such as motion vectors for inter coding or prediction modes for intra coding. Syntax elements included in the entropy coded bitstream may also include filter information or other data that may be used in the decoding process.

CAVLC is one type of entropy coding technique supported by the ITU H.264/MPEG4, AVC standard, which may be applied on a vectorized basis by entropy coding unit 46. CAVLC uses variable length coding (VLC) tables in a manner that effectively compresses serialized "runs" of transform coefficients and/or syntax elements. CABAC is another type of entropy coding technique supported by the ITU H.264/MPEG4, AVC standard, which may be applied on a vectorized basis by entropy coding unit 46. CABAC may involve several stages, including binarization, context model selection, and binary arithmetic coding. In this case, entropy coding unit 46 codes transform coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. Again, the encoded video may comprise the entropy coded motion vectors and other various syntax that may be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction unit 32 to produce a reconstructed video block for storage in memory 34. Prior to such storage, filtering may also be applied on the video block to improve video quality. Such filtering may reduce blockiness or other artifacts, and may be performed in loop (in which case the data used for prediction is filtered data) or post loop (in which case the data used for prediction is unfiltered data).

Figure 3:
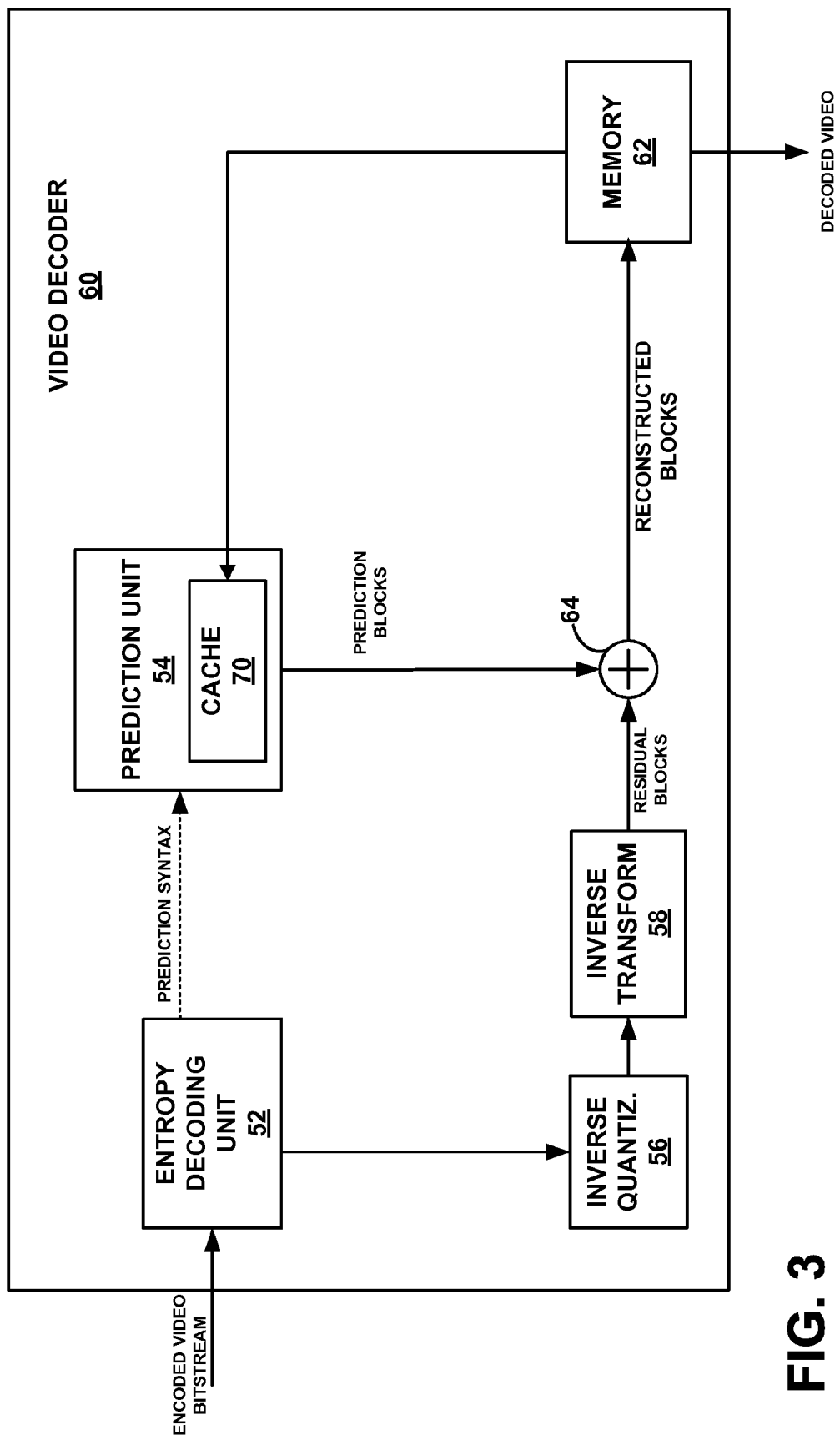
FIG. 3 is a block diagram illustrating an exemplary video decoder that may perform decoding techniques consistent with this disclosure.

FIG. 3 is a block diagram illustrating an example of a video decoder 60, which decodes a video sequence using one or more of the techniques of this disclosure. The received video sequence may comprise an encoded set of image frames, a set of frame slices, a commonly coded group of pictures (GOPs), or a wide variety of coded video units that include encoded video blocks and syntax to define how to decode such video blocks. Video decoder 60 may correspond to video decoder 28 of system 10 in FIG. 1, or may comprise a video decoder of another device. The various components illustrated in FIG. 3 are shown for illustrative purposes. The various components may be combined and other components may exist.

As described in greater detail below, video decoder 60 may modify or adjust the decoding order of video blocks relative to conventional decoding techniques. Conventionally, video units may be decoded sequentially in the decoding order. Moreover, the video blocks of each video unit may be decoded in the raster scan order from the first video block in the upper left-hand corner of a video unit to the last video block in the lower right-hand corner. The techniques of this disclosure, however, modify this decoding order of video blocks in a manner that promotes the efficient use of memory.

The decoding order may be modified temporally such that video blocks of different video frames or slices (or other coded units) are decoded in parallel. In this case, the decoding order of video blocks may alternate between video blocks of two or more different frames. Furthermore, the decoding order may also be modified spatially within a given video block such that the video blocks are decoded in an order that does not correspond to the raster scan order of the video blocks. A statistical metric may be used to help predict those video blocks that should be ordered for earlier decoding than might otherwise be performed so that such video block decoding can use data in cache 70 before such data is replaced. In this way, the number of memory loads to cache 70 may be reduced over time.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoded video blocks in a one-dimensional serialized format may be inverse scanned to convert one or more one-dimensional vectors of coefficients back into a two-dimensional block format. The number and size of the vectors, as well as the scan order defined for the video blocks may define how the two-dimensional block is reconstructed. Entropy decoded prediction syntax elements such as motion vectors (and possibly other decoded syntax elements) may be sent from entropy decoding unit 52 to prediction unit 54.

Video decoder 60 also includes a prediction unit 54, an inverse quantization unit 56, an inverse transform unit 58, a memory 62 and a summer 64. In addition, video decoder 60 may also include a filter unit (not shown) that filters the output of summer 64. Prediction unit 54 may include an associated cache 70, which may comprise a relatively fast internal memory circuit, e.g., that is faster and smaller than memory 62. Predictive data may be loaded from memory 62 to cache 70 based on statistics of one or more video units so as to promote data in cache 70 that will be needed for the decoding process. Moreover, to further promote the use of data in cache 70 without needing to reload such data, the decoding order of video blocks of different coded video units may be modified so that the decoding order does not correspond to the display order. Two or more video units may be decoded in parallel such that the decoding process alternates between the video blocks of the two or more different video units. In this case, prediction unit 54 may identify video units that cannot be interdependent, and may use coding statistics to populate cache 70 and define the decoding order of video blocks so as to promote use of data in cache 70. A first video unit and a second video unit cannot be interdependent if the video blocks of the first video unit cannot have motion vectors that point to video blocks of the second video unit, and vice versa.

Prediction unit 54 receives prediction syntax (such as motion vectors) from entropy decoding unit 52. Using the prediction syntax, prediction unit 54 generates the prediction blocks from cache 70, which may be combined with residual blocks via adder 64. Inverse quantization unit 56 performs inverse quantization, and inverse transform unit 58 performs inverse transforms to change the coefficients of the residual video blocks back to the pixel domain. Adder 64 combines each prediction block with the corresponding residual block output by inverse transform unit 58 in order to reconstruct a given video block.

In general, video decoder 60 may receive a sequence of video units, and the sequence may define a display order of the video units. Prediction unit 54 may identify a subset of the video units that cannot be interdependent, and may load predictive data from memory 62 to cache 70, where cache 70 is associated with the prediction unit 54 of decoder 60. Memory 62 may also be associated with decoder 70, or may be an external memory that is shared with other processors or units. In general, however, cache 70 may comprise a memory circuit that is smaller in size and faster in terms of memory access speeds than memory 62. The size of cache 70 may be specifically designed so as to avoid the need for cache warm-up anywhere except at the beginning of several macroblock rows. In particular, the size of the cache may be chosen so as minimize cache misses. The process may move to successive sets of 4 macroblock rows (from several frames), and when the process moves to another set of macroblock rows, the data in cache may be expected to be invalid due to the frame width being relatively large. In this case, many cache misses may be expected during a warm-up period, but after the warm-up period, the techniques of this disclosure may help to reduce such cache misses that could occur.

Prediction unit 54 may decode video blocks of the subset of encoded video units based at least in part on the predictive data in cache 70. According to this disclosure, prediction unit 54 may define a decoding order in which at least some video blocks of a second video unit are decoded before at least some video blocks of a first video unit, wherein the second video unit occurs after the first video unit in the display order. Memory 62 and cache 70 may comprise any of a wide variety of memory circuits. Typically, cache 70 is a smaller and faster memory relative to memory 62. As one example, memory 62 may comprise dynamic random access memory (DRAM) and cache 70 may comprise static random access memory (SRAM) or embedded DRAM.

The sequence of encoded video units may comprise a sequence of video frames, a sequence of portions of video frames, or a sequence of slices of video frames. The decoding order may alternate between one or more video blocks of the first encoded video unit and one or more video blocks of the second video unit. According to this disclosure, the decoding order may be defined so as to substantially improve a likelihood that the predictive data loaded in the cache is used in decoding the video blocks of the subset of video units without needing to reload the cache.

The decoding order may also be spatially defined or changed for video blocks of a given coded unit. In this case, the decoding order may be defined by prediction unit 54 such that the video blocks of the first video unit are decoded in an order that does not correspond to a raster scan order of the first video unit and the video blocks of the second video unit are decoded in an order that does not correspond to a raster scan order of the second video unit. Accordingly, at least one video block of a second row of the first video unit may be decoded prior to at least one video block of a first row of the first video unit, wherein the second row is below the first row in a displayed version of the video unit.

In order to define the decoding order, prediction unit 54 may use statistics of the video blocks in the different coded video units. Prediction unit 54 or possibly entropy decoding unit 52 or a separate pre-processing unit (not shown) may pre-process a video stream for several frames in advance in order to generate the statistics. The statistics may comprise a global motion vector for all of the pre-processed frames and associated reference frame lists. The global motion vector, in this context may not represent any real motion, but may comprise the average motion vector in the stream, e.g., for all of the pre-processed frames. The global motion vector may be used to identify the average horizontal and vertical displacement between frames that provide the best chances of overlap in reference data readout. The average horizontal and vertical displacement between frames may be quantified and rounded, e.g., to the nearest 16 pixels, to define likely areas of different frames that will have overlapping reference data. The preprocessed frames may comprise a sliding window of frames, or may comprise a discrete set of frames, such as a set of IBPBP frames or a set of IBBPBBP frames, discussed in greater detail below.

Again, prediction unit 54 (or another unit that performs pre-processing) may first determine two or more video units that cannot be interdependent, e.g., meaning that such video units do not rely on the data of one another for prediction. These types of non-interrelated video units may be decoded in parallel, and the data loaded into cache 70 (together with a defined coding order of the video blocks) may help to ensure that duplicative loads to cache 70 are avoided. Any predictive data loaded from memory 62 to cache 70 may be used for decoding of several video blocks even if such video blocks are non-sequential within a video unit, or included in two or more different video units.

In one example, prediction unit 54 may define a statistical metric associated with video blocks in the sequence of video units, and may define the decoding order at least in part on the statistical metric. The statistical metric may comprise a global motion metric that quantifies average motion across at least a portion of the sequence of video units. In another example, prediction unit 54 may determine an average motion metric that quantifies average motion of video blocks between the first video unit and the second video unit, wherein the first video unit and the second video unit are units that cannot be interdependent. Prediction unit 54 may then define the decoding order at least in part on the average motion metric.

As explained in greater detail below, the techniques of this disclosure may work with commonly used sequences of video units. In one example, the sequence of video units follow an IBPBP format including an I-frame, followed by a first B-frame, followed by a first P-frame, followed by a second B-frame, followed by a second P-frame, wherein the subset of the video units consist of the first B-frame and the second P-frame. In another example, the sequence of video units may follow an IBBPBBP format including an I-frame, followed by a first B-frame, followed by a second B-frame, followed by a first P-frame, followed by a third B-frame, followed by a fourth B-frame, followed by a second P-frame, wherein the subset of the video units consist of the first B-frame, the second B-frame and the second P-frame. Pre-processing may occur on discrete sets of IBPBP frames or discrete sets of IBBPBBP frames, or could be done in a sliding window to define average motion over the sliding window of frames. The technique may also apply to other types of video units, such as slices or other portions of frames.

The term I-frame refers to an intra-coded frame. The term P-frame refers to a predictive inter-coded frame that relies on one set of predictive data. The term B-frame refers to a bi-predictive inter-coded frame that relies on two different sets of predictive data (e.g., from two different frames). IBPBP and IBBPBBP are two common ways in which video sequences are encoded. The techniques of this disclosure may apply to these or other encoded video sequences.

Figure 4:
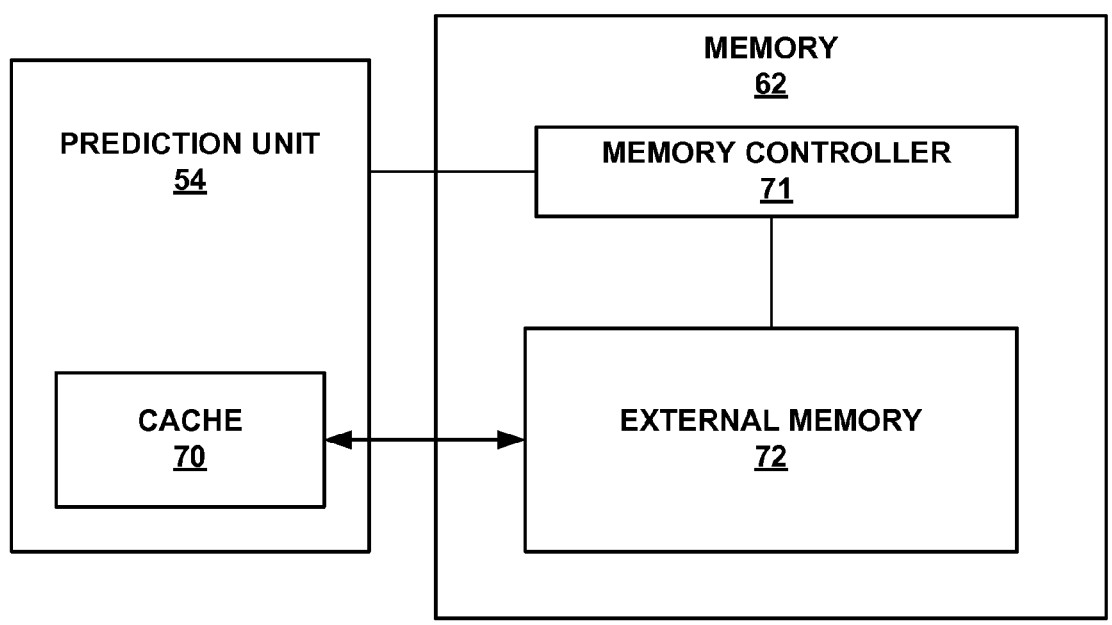
FIG. 4 is a block diagram illustrating a prediction unit and memory of a video decoder in greater detail.

FIG. 4 is a block diagram illustrating prediction unit 54 and memory 62 in greater detail. As shown, prediction unit 54 includes a cache, which may comprise a small and fast memory relative to external memory 72. Prediction unit may issue memory fetch commands to memory controller 71, which causes data to be loaded from external memory 72 to the internal cache 70 of prediction unit 54. Memory 72 may be external in that it is located outside of a processor that otherwise forms decoder 50. Cache 70, in contrast, may comprise an internal memory to a processor that forms decoder 50. The processor may be programmed or configured to perform the various functions of the different units and modules shown in FIG. 3.

Again, this disclosure provides techniques that include loading predictive data from memory 62 to a cache 70. The decoding order of video blocks may be defined in a manner that promotes use of the data loaded into cache 70, and reduces the need to perform additional memory to cache re-loads until the data in cache 70 is used for any predictive decoding that relies on such data. In this way, the techniques may improve the use of memory 62 and cache 70 by improving the likelihood of cache hits in cache 70, thereby reducing the number of memory loads from external memory 72.

Again, the decoding order may be modified temporally such that video blocks of different video frames (or other coded units) are decoded in an alternating manner. In this case, the decoding order of video blocks may alternate between video blocks of two or more different frames. Furthermore, the decoding order may also be modified spatially within a given video block such that the video blocks are decoded in an order that does not correspond to the raster scan order of the video blocks.

FIG. 5 is a conceptual diagram illustrating a video unit of video blocks 77, such as a video frame, which may be decoded in a decoding order that differs from a raster scan order of the video blocks. This scenario may be referred to as the spatial reordering of the decoding order of video blocks of video unit 77. In FIG. 5 the video blocks of video unit 77 are labeled from 1 to 64 in the raster scan order. According to this disclosure, however, the decoding order of the video blocks of video unit 77 may differ from this raster scan order. In particular, it may be advantageous to decode one or more video blocks of the second row (VB 9 to VB 16) prior to decoding all of the video blocks of the first row (VB 1 to VB 8). For example, VB 1 and VB 10 may be more likely to rely on the same predictive data than VB 1 and VB 9 due to spatial proximity of VB 1 and VB 10. For this reason, it may be more advantageous from the standpoint of usage of cache 70 to decode VB 10 prior to decoding VB 8. Since the decoding is dependent upon the encoding that was originally performed, video decoder 50 may utilize motion vector statistics of the motion vectors of the video blocks shown in FIG. 5 in order to define the decoding order. The general statistics of motion vectors (e.g., the average motion of video unit 77) may allow video decoder 50 to estimate a desirable decoding order relative to a set of data loaded into cache 70 so as to promote cache hits and reduce the need to load and replace data in cache 70.

Figure 6:
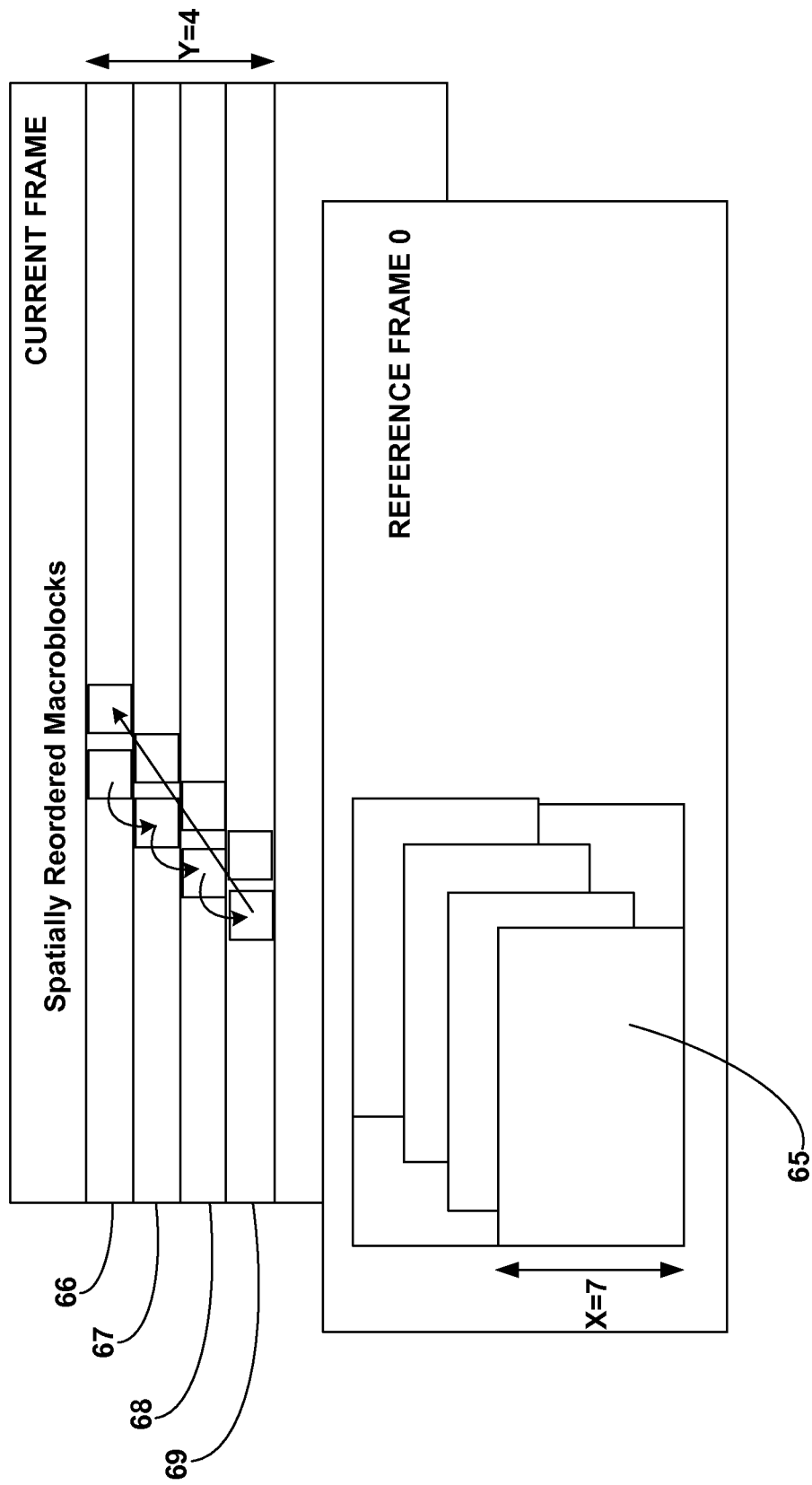
FIG. 6 is a conceptual diagram illustrating spatial reordering of macroblocks within a frame.

FIG. 6 is a conceptual diagram illustrating spatial reordering of macroblocks within a frame. As shown, a first macroblock of row 66 is decoded. Then, a second macroblock from row 67 is decoded. Next, a third macroblock from row 68 is decoded, and finally a fourth macroblock from row 69 is decoded. At this point, a next macroblock from row 66 may be decoded. In this manner, the decoding order is defined such that the video blocks a given video unit are decoded in an order that does not correspond to a raster scan order. In other words, at least one video block of a second row of the first video unit is decoded prior to at least one video block of a first row of the first video unit, wherein the second row is below the first row. This allows a reference area 65 from a reference frame to be more fully exploited in cache 70 (FIG. 3), avoiding loads and reloads of data from memory 62 to cache 70.

FIG. 7 is a conceptual diagram illustrating two different units of video blocks (78 and 79), such as two different video frames, that may be decoded in parallel. This scenario may be referred to as the temporal reordering of the decoding order of video blocks of video units 78 and 79. This disclosure contemplates both temporal reordering and spatial reordering of video blocks to improve cache usage and substantially maximize cache hits.

In the case of temporal reordering, video decoder 50 may alternate between the video blocks of video units 78 and 79 in the decoding process. In FIG. 7, the video blocks of video unit 78 are labeled from 1 to 64 in the raster scan order, and the video blocks of video unit 79 are similarly labeled from 1 to 64 in the raster scan order. According to this disclosure, however, the decoding order of the video blocks of video units 78 and 79 may differ from the raster scan orders insofar as video blocks of video units 78 and 79 may be co-decoded in parallel. In particular, it may be advantageous to decode one or more video blocks of the video unit 79 prior to decoding all of the video blocks of the video unit 78.

For example, co-located or closely located video blocks of video units 78 and 79 may be more likely to rely on the same predictive data than two more spatially distant video blocks of a given video unit. For this reason, it may be more advantageous from the standpoint of usage of cache 70 to decode VB 1 of video unit 79 prior to decoding VB 8 of video unit 78. Video units 78 and 79 may be non-interdependent, meaning that video unit 78 does not rely on any data of video unit 79 for prediction, and video unit 79 does not rely on any data of video unit 78 for prediction. This allows for the in-parallel decoding of video units 78 and 79 and the alternating between video blocks of video units 78 and 79 in the decoding process.

Video decoder 50 may utilize motion vector statistics of the motion vectors of the video blocks of video unit 78 relative to motion vectors of video blocks of video unit 79 in order to define the decoding order. In this case, relative motion between video units 78 and 79 may be used to estimate those video blocks that may uses similar data for the decoding. As an illustration, the bold-faced blocks shown in video units 78 and 79 may all rely on a common set of predictive data. However, the bolded blocks of video unit 79, as shown, have motion relative to the bolded blocks of video unit 78. The average motion of the video blocks of video unit 78 relative to those of video unit 79 may be used to quantify or estimate the expected motion to thereby allow video decoder to define an alternating video block decoding order that alternates between video blocks of video unit 78 and video unit 79. In this way, those video blocks of video units 78 and 79 that rely on similar data for the decoding may be decoded more closely in time, thereby helping to maximize the likelihood of cache its in cache 70, and thereby reducing duplicative memory loads to cache 70 over the decoding process.

Figure 8B:
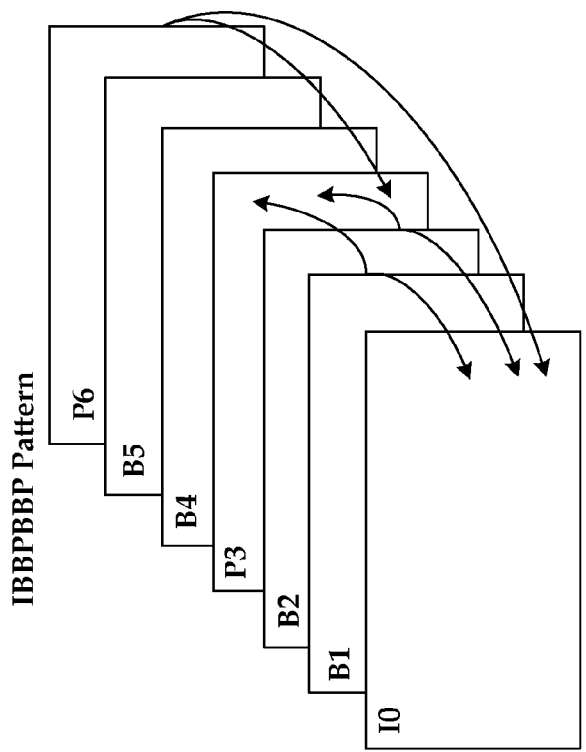
FIG. 8B is a conceptual diagram illustrating an IBBPBBP pattern of video units.
Figure 8A:
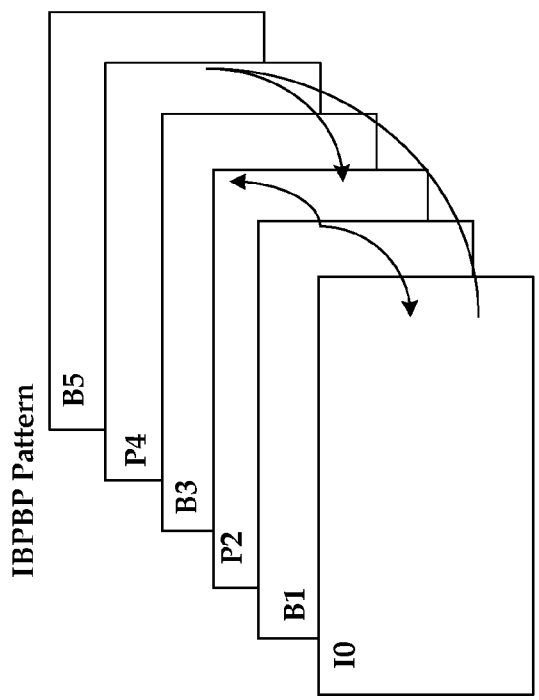
FIG. 8A is a conceptual diagram illustrating an IBPBP pattern of video units.

FIG. 8A is a conceptual diagram illustrating an IBPBP pattern of video units. In an IBPBP format, a sequence of video frames include an I-frame, followed by a first B-frame, followed by a first P-frame, followed by a second B-frame, followed by a second P-frame. In this case, the first B-frame and the second P-frame cannot be interdependent. Therefore, video decoder 50 may identify or define the first B-frame and the second P-frame as candidates for co-decoding in parallel. In this case, video decoder 50 may process the video frames sequentially, but may decode the first B-frame and the second P-frame in parallel, alternating between the video blocks of the first B-frame and the video blocs of the second P-frame FIG. 8B is a conceptual diagram illustrating an IBBPBBP pattern of video units. In an IBBPBBP format, a sequence of video frames include an I-frame, followed by a first B-frame, followed by a second B-frame, followed by a first P-frame, followed by a third B-frame, followed by a fourth B-frame, followed by a second P-frame. In this case, the first B-frame, the second B-frame and the second P-frame cannot be interdependent. Therefore, video decoder 50 may identify or define the first B-frame, the second B-frame and the second P-frame as candidates for co-decoding in parallel. In this case, video decoder 50 may generally process the video frames sequentially, but may decode the first B-frame, the second B-frame and the second P-frame in parallel, alternating between the video blocks of the first B-frame, the second B-frame and the second P-frame.

Figure 9:
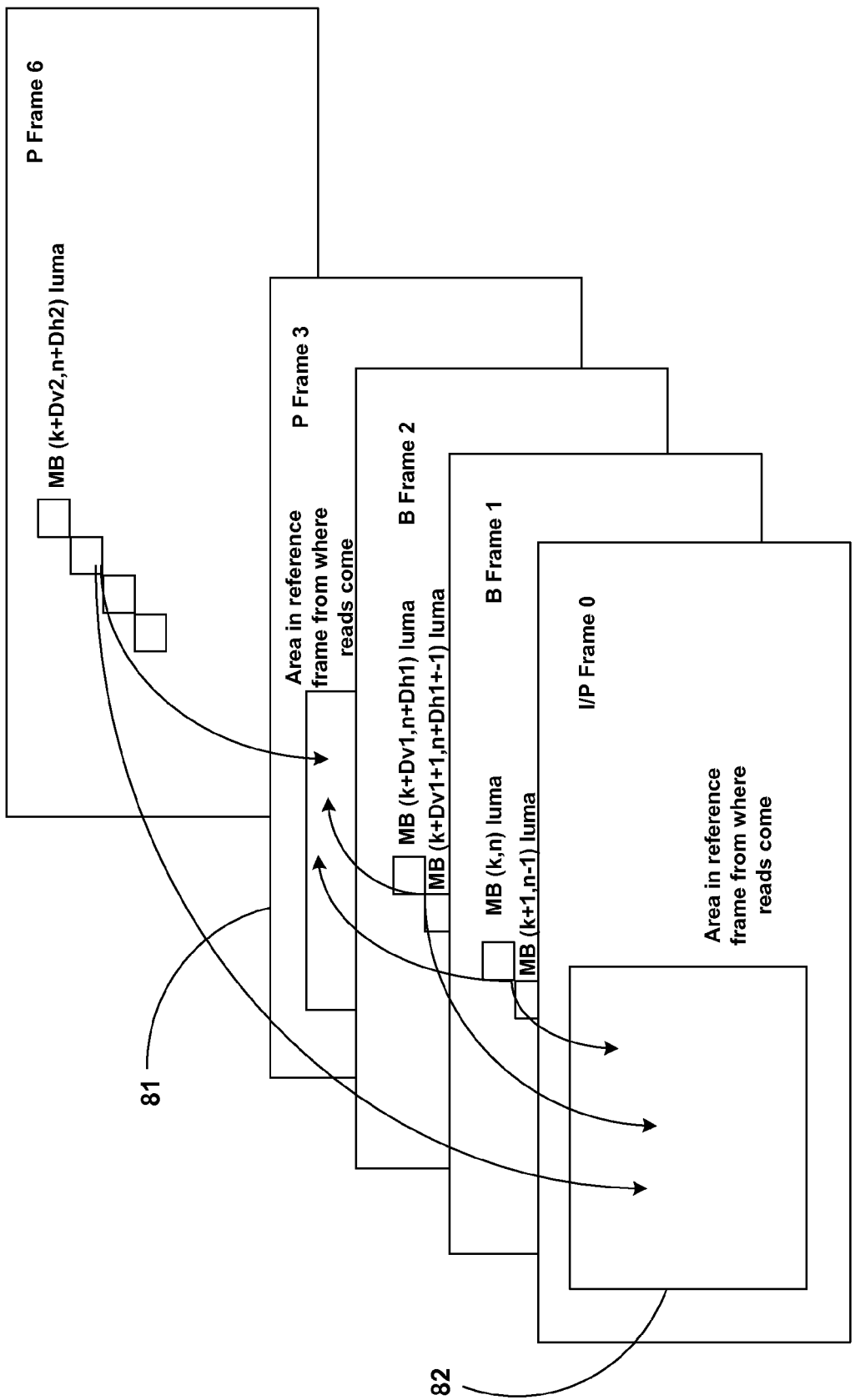
FIG. 9 is a conceptual diagram illustrating frames that have video blocks that may be decoded in parallel.

FIG. 9 is a conceptual diagram illustrating frames that have video blocks that may be decoded in parallel. The scenario shown in FIG. 9 may be similar to that of FIG. 8B, in which the video frames follow an IBBPBBP format. The frames in this IBBPBBP format may be labeled as P/I-frame 0, B-frame 1, B-frame 2, P-frame 3, B-frame 4, B-frame 5 and P-frame 6. Only some of these frames are illustrated in FIG. 9.

FIG. 9 illustrates one example where reference frame reads during decoding are coming from the same area for macroblocks in different frames. Depending on correlation between motion vectors in temporally and spatially adjacent macroblocks, the similarity of read area consecutively processed macroblocks could vary. In FIG. 9, MB stands for a macroblock, and the notation represents row and column positions (e.g., the row is k, the column is n, Dv1 is vertical displacement between frames, Dh1 is horizontal displacement between frames). Dv1 and Dh1 may be based on a statistical metric like the global motion vectors described herein.

As shown in FIG. 9, B-frame 1, B-frame 2 and P-frame 6 all may depend upon data from P-frame 3 and I/P-frame 0. The illustrated video blocks of B-frame 1, B-frame 2 and P-frame 6 shown in FIG. 9, for example, may each depend upon the subsets of data defined by areas 81 and 82 of P-frame 3 and I/P frame 0 respectively. In this case, it can be advantageous to decode the video blocks of B-frame 1, B-frame 2 and P-frame 6 in parallel so that the data in areas 81 and 82 can be fully exploited in cache 70 prior to reloading cache 70 for later decoding.

Accordingly, video decoder 50 may define a decoding order for the video blocks of B-frame 1, B-frame 2 and P-frame 6 that alternates between video blocks of the different frames. Video decoder 50, for example, may decode a block from B-frame 1, followed by a block from B-frame 2, followed by a block from P-frame 6, followed by another block from B-frame 1, followed by another block from B-frame 2, followed by another block from P-frame 6, and so forth. As explained herein, the global motion of the different frames, or the relative motion of such frames defined by one or more statistical metrics based on the motion vectors, may be used to define the spatial locations within each frame where the alternating between video blocks occurs. In other words, the alternating between video blocks may not occur with respect to co-located video blocks, but may occur with respect to video blocks of the different frames that are offset by an estimated amount of average motion between such frames. The temporal reordering of video blocks may be combined with the spatial reordering of video blocks within each frame to further improve the use of cache 70.

Figure 10A:
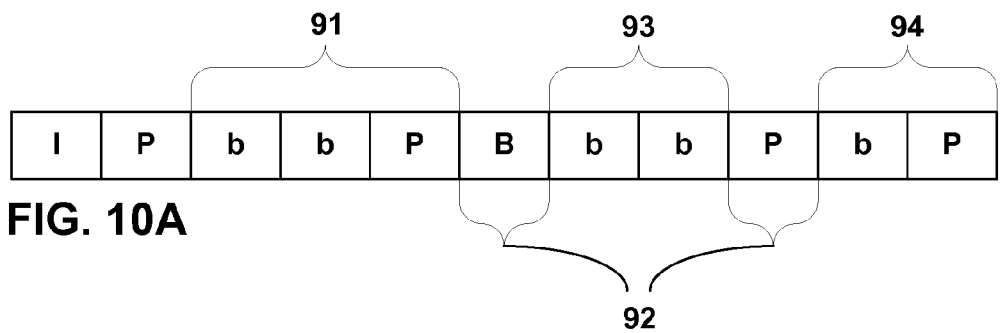
FIG. 10A is a conceptual diagram illustrating video units in a display order as defined in an input stream.

FIG. 10A is a conceptual diagram illustrating video units in a display order as defined in an input stream. In this example, the input stream comprises an I-frame followed by a P-frame, followed by a b-frame, followed by a b-frame, followed by a P-frame, followed by a B-frame, followed by a b-frame, followed by a b-frame, followed by a P-frame, followed by a b-frame, followed by a P-frame. B-frames may comprise bi-predictive frames that are themselves used as predictive data, whereas, b-frames may comprise bi-predictive frames that cannot be used as predictive data. Sets of frames defined by numerals 91, 92, 93 and 94 may be sets that can be decoded at the same time. Set 91 may not have any interdependencies. Similarly, set 92, set 93 and set 94 may also not have any interdependencies within each given set. Accordingly, each of these sets 91, 92, 93 and 94 may be identified by decoder 50 as being co-decodable.

Figure 10B:
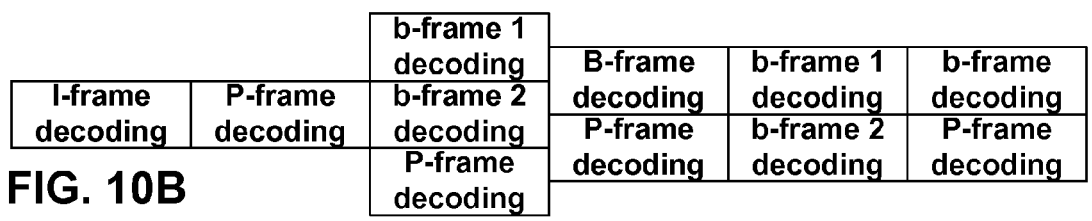
FIG. 10B is conceptual diagram illustrating the decoding of video units according to a decoding order that differs from the display order.

FIG. 10B is conceptual diagram illustrating the decoding of video units according to a decoding order that differs from the display order. In this case, decoder 50 may perform I-frame decoding, followed by P-frame decoding. Decoder 50 may then perform decoding in parallel for b-frame 1, b-frame 2 and P-frame, e.g., defined by set 91 in FIG. 10A. In this case, decoder 50 may alternate between the video blocks of the different frames in set 91 in order to more efficiently use cache 70 as described herein.

Next, decoder 50 may perform B-frame decoding in parallel with P-frame decoding of set 92. Next, decoder 50 may perform b-frame decoding in parallel with b-frame decoding of set 93. Finally, decoder 50 may perform b-frame decoding in parallel with P-frame decoding of set 94. In performing the decoding in parallel, decoder 50 may alternate between video blocks of the different frames according to a temporal reordering of video blocks that promotes use of data in cache 70 without needing memory re-loads. At the same time, spatial reordering of video blocks for each individual frame may also be performed by video decoder 50 to further improve the number of cache hits.

Figure 11:
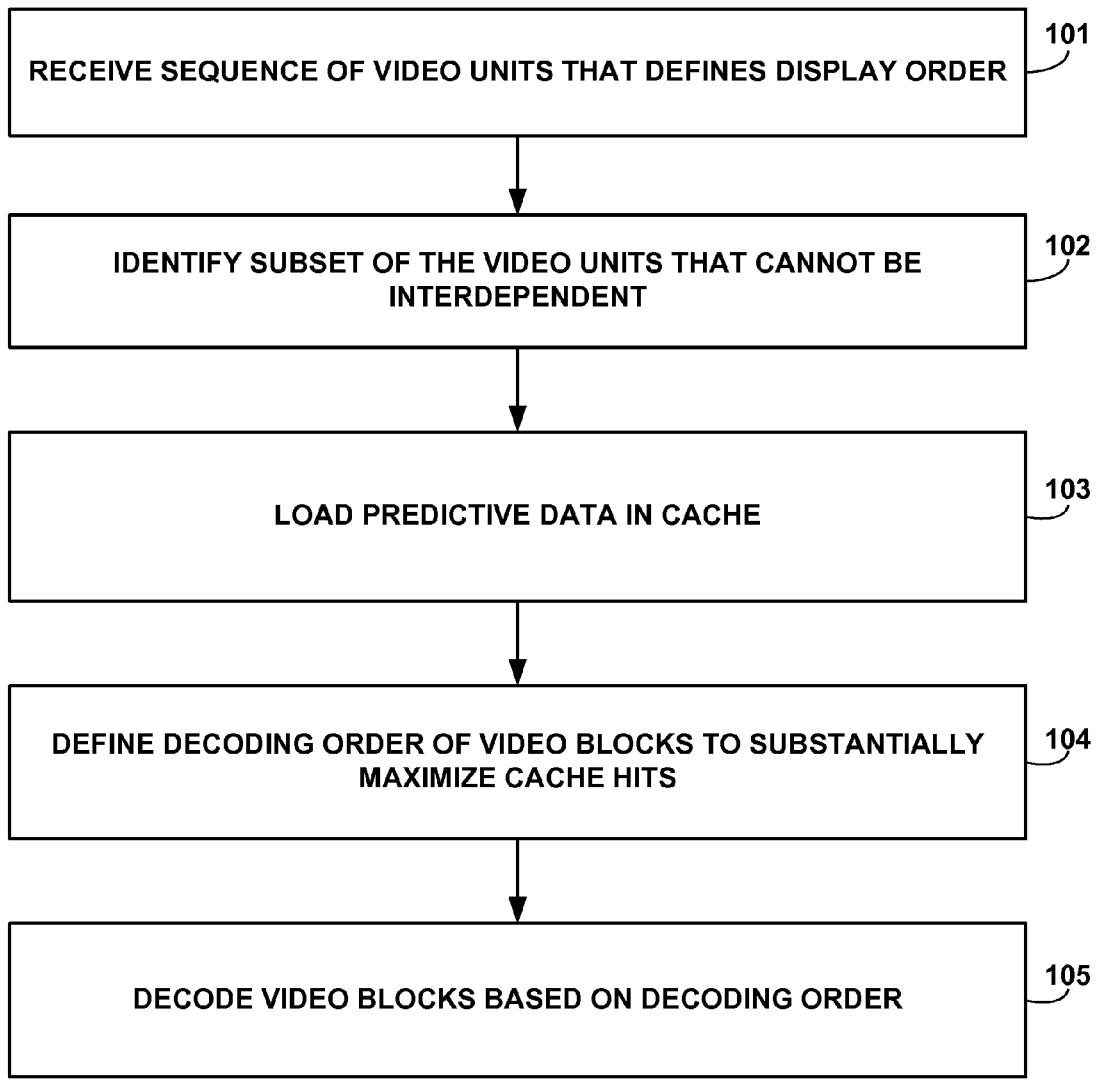
FIG. 11 is a flow diagram illustrating a decoding technique according to this disclosure.

FIG. 11 is a flow diagram illustrating a decoding technique according to this disclosure. As shown in FIG. 5, video decoder 50 receives a sequence of video units that defines a display order (101). Video decoder 50 may perform pre-processing to identify a subset of the video units that cannot be interdependent (102). For example, entropy decoding unit 52 or prediction unit 54 or possibly a separate pre-processing unit (not shown) may perform the pre-processing of the video sequence to identify the subset of the video units that cannot be interdependent. Furthermore, as part of this pre-processing, statistics such as those described herein, may be gathered for use in defining the decoding order of video blocks. As mentioned, for example, the global motion defined over a sequence of frames may be used to approximate or estimate global motion in the set of frames, which may then be used to help define a desirable decoding order. Video decoder 50 may include additional frame buffers for storing the input video stream during the pre-processing and decoding stages since several frames may be pre-processed prior to decoding, and sets of frames may then be decoded in parallel according to this disclosure.

Prediction unit 54 loads predictive data from memory 62 to a cache 70 associated with prediction unit 54 (103). Prediction unit 54 (or possibly a separate pre-processing unit) may define a decoding order of video blocks that substantially maximizes cache hits (104). In this case, the decoding order may alternate between video blocks of different frames (temporal reordering), and may also follow an order within a given frame that differs from its raster scan order (spatial reordering). Prediction unit 54 decodes the video blocks based on the defined decoding order (105).

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of decoding video data, the method comprising:
   receiving a sequence of video frames in a decoder, wherein the sequence defines a display order of the video frames, each video frame including a plurality of video blocks;
   identifying, at the decoder, a plurality of frames included in the sequence of video frames to be decoded in a decoding order different from the display order, wherein none of the plurality of frames comprises video blocks that are dependent on video blocks of another frame of the plurality of frames and wherein the plurality of frames includes at least a first video frame and a second video frame;
   defining a statistical metric associated with the plurality of video blocks, wherein the statistical metric comprises at least one of an average motion across at least a portion of the sequence of video frames and an average motion across the first and second video frames;
   loading, from a memory to a cache, predictive data for the plurality of frames based on the statistical metric, wherein the cache is in data communication with the decoder;
   defining the decoding order of the video blocks of the identified plurality of frames based at least in part on the statistical metric, wherein the defined decoding order of the plurality of frames reduces a number of times predictive data is loaded from the memory to the cache, wherein the decoding order defines a spatial order and a temporal order in which the plurality of frames is decoded based on the statistical metric; and
   decoding the video blocks of the plurality of frames using the predictive data in the cache according to the decoding order, wherein the decoding order identifies at least some video blocks included in the second video frame for decoding before at least some video blocks included in the first video frame, the blocks of the first video frame being further identified for decoding before completely decoding the second video frame, wherein the second video frame occurs after the first video frame in the display order.

2. The method of claim 1, wherein the sequence of encoded video frames comprises at least one of:
   a sequence of portions of video frames; and
   a sequence of slices of video frames.

3. The method of claim 1, wherein the decoding order alternates between one or more video blocks of the first encoded video frame and one or more video blocks of the second video frame.

4. The method of claim 1, wherein the decoding order is based on a likelihood that the predictive data loaded in the cache is used in decoding the video blocks of the plurality of frames without needing to reload the cache.

5. The method of claim 1, wherein the decoding order is defined such that the video blocks of the first video frame are decoded in an order that does not correspond to a raster scan order of the first video frame and the video blocks of the second video frame are decoded in an order that does not correspond to a raster scan order of the second video frame.

6. The method of claim 5, wherein at least one video block of a second row of the first video frame is decoded prior to at least one video block of a first row of the first video frame, wherein the second row is below the first row.

7. The method of claim 1, wherein the first video frame comprises a first B-frame and the second video frame comprises a second P-frame, and wherein the sequence of video frames follows an IBPBP format including an I-frame, followed by the first B-frame, followed by a first P-frame, followed by a second B-frame, followed by the second P-frame, wherein the identified plurality of frames consist of the first B-frame and the second P-frame.

8. The method of claim 1, wherein the first video frame comprises a first B-frame and the second video frame comprises a second P-frame, and wherein the sequence of video frames follows an IBBPBBP format including an I-frame, followed by the first B-frame, followed by a second B-frame, followed by a first P-frame, followed by a third B-frame, followed by a fourth B-frame, followed by the second P-frame, wherein the identified plurality of frames consist of the first B-frame, the second B-frame, and the second P-frame.

9. The method of claim 1, wherein the video blocks of the second video frame are decoded in parallel with the video blocks of the first video frame.

10. An apparatus that decodes video data, the apparatus comprising a video decoder and an associated cache, the video decoder being configured to:
   receive a sequence of video frames wherein the sequence defines a display order of the video frames, each video frame including a plurality of video blocks;
   identify a plurality of frames included in the sequence of video frames to be decoded in a decoding order different from the display order, wherein none of the plurality of frames comprises video blocks that are dependent on video blocks of another frame of the plurality of frames and wherein the plurality of frames includes at least a first video frame and a second video frame;
   define a statistical metric associated with the plurality of video blocks, wherein the statistical metric comprises at least one of an average motion across at least a portion of the sequence of video frames and an average motion across the first and second video frames;
   load, from a memory to the cache, predictive data for the plurality of frames based on the statistical metric;
   define the decoding order of the video blocks of the identified plurality of frames based at least in part on the statistical metric, wherein the defined decoding order of the plurality of frames reduces a number of times predictive data is loaded from the memory to the cache, wherein the decoding order defines a spatial order and a temporal order in which the plurality of frames is decoded based on the statistical metric; and
   decode the video blocks of the plurality of frames using the predictive data in the cache according to the decoding order, wherein the decoding order identifies at least some video blocks included in the second video frame for decoding before at least some video blocks included in the first video frame, the blocks of the first video frame being further identified for decoding before completely decoding the second video frame, wherein the second video frame occurs after the first video frame in the display order.

11. The apparatus of claim 10, wherein the sequence of encoded video frames comprises at least one of:
a sequence of portions of video frames; and
a sequence of slices of video frames.

12. The apparatus of claim 10, wherein the decoding order alternates between one or more video blocks of the first encoded video frame and one or more video blocks of the second video frame.

13. The apparatus of claim 10, wherein the decoding order is based on a likelihood that the predictive data loaded in the cache is used in decoding the video blocks of the plurality of frames without needing to reload the cache.

14. The apparatus of claim 10, wherein the decoding order is defined such that the video blocks of the first video frame are decoded in an order that does not correspond to a raster scan order of the first video frame and the video blocks of the second video frame are decoded in an order that does not correspond to a raster scan order of the second video frame.

15. The apparatus of claim 14, wherein at least one video block of a second row of the first video frame is decoded prior to at least one video block of a first row of the first video frame, wherein the second row is below the first row.

16. The apparatus of claim 10, wherein the first video frame comprises a first B-frame and the second video frame comprises a second P-frame, and wherein the sequence of video frames follow an IBPBP format including an I-frame, followed by the first B-frame, followed by a first P-frame, followed by a second B-frame, followed by the second P-frame, wherein the identified plurality of frames consist of the first B-frame and the second P-frame.

17. The apparatus of claim 10, wherein the first video frame comprises a first B-frame and the second video frame comprises a second P-frame, and wherein the sequence of video frames follow an IBBPBBP format including an I-frame, followed by the first B-frame, followed by a second B-frame, followed by a first P-frame, followed by a third B-frame, followed by a fourth B-frame, followed by the second P-frame, wherein the identified plurality of frames consist of the first B-frame, the second B-frame and the second P-frame.

18. The apparatus of claim 10, wherein the video decoder comprises an integrated circuit.

19. The apparatus of claim 10, wherein the video decoder comprises a microprocessor.

20. The apparatus of claim 10, wherein the apparatus comprises a wireless communication device that includes the video decoder.

21. A device that decodes video data, the device comprising:
means for receiving a sequence of video frames wherein the sequence defines a display order of the video frames, each video frame including a plurality of video blocks;
means for identifying a plurality of frames included in the sequence of video frames to be decoded in a decoding order different from the display order, wherein none of the plurality of frames comprises video blocks that are dependent on video blocks of another frame of the plurality of frames and wherein the plurality of frames includes at least a first video frame and a second video frame;
means for defining a statistical metric associated with the plurality of video blocks, wherein the statistical metric comprises at least one of an average motion across at least a portion of the sequence of video frames and an average motion across the first and second video frames;
means for loading, from a memory to a cache, predictive data for the plurality of frames based on the statistical metric;
means for defining the decoding order of the video blocks of the identified plurality of frames based at least in part on the statistical metric, wherein the defined decoding order of the plurality of frames reduces a number of times predictive data is loaded from the memory to the cache, wherein the decoding order defines a spatial order and a temporal order in which the plurality of frames is decoded based on the statistical metric; and
means for decoding the video blocks of the plurality of frames included in the video frames using the predictive data in the cache according to the decoding order, wherein the decoding order identifies at least some video blocks included in the second video frame for decoding before at least some video blocks included in the first video frame, the blocks of the first video frame being further identified for decoding before completely decoding the second video frame, wherein the second video frame occurs after the first video frame in the display order.

22. The device of claim 21, wherein the sequence of encoded video frames comprises at least one of:
a sequence of portions of video frames; and
a sequence of slices of video frames.

23. The device of claim 21, wherein the decoding order alternates between one or more video blocks of the first encoded video frame and one or more video blocks of the second video frame.

24. The device of claim 21, wherein the decoding order is based on a likelihood that the predictive data loaded in the cache is used in decoding the video blocks of the plurality of frames without needing to reload the cache.

25. The device of claim 21, wherein the decoding order is defined such that the video blocks of the first video frame are decoded in an order that does not correspond to a raster scan order of the first video frame and the video blocks of the second video frame are decoded in an order that does not correspond to a raster scan order of the second video frame.

26. The device of claim 25, wherein at least one video block of a second row of the first video frame is decoded prior to at least one video block of a first row of the first video frame, wherein the second row is below the first row.

27. The device of claim 21, wherein the first video frame comprises a first B-frame and the second video frame comprises a second P-frame, and wherein the sequence of video frames follow an IBPBP format including an I-frame, followed by the first B-frame, followed by a first P-frame, followed by a second B-frame, followed by the second P-frame, wherein the identified plurality of frames consist of the first B-frame and the second P-frame.

28. The device of claim 21, wherein the first video frame comprises a first B-frame and the second video frame comprises a second P-frame, and wherein the sequence of video frames follow an IBBPBBP format including an I-frame, followed by the first B-frame, followed by a second B-frame, followed by a first P-frame, followed by a third B-frame, followed by a fourth B-frame, followed by the second P-frame, wherein the identified plurality of frames consist of the first B-frame, the second B-frame and the second P-frame.

29. A non-transitory computer-readable storage medium comprising instructions that upon execution in a processor cause the processor to:
upon receiving a sequence of video frames, wherein the sequence defines a display order of the video frames, each video frame including a plurality of video blocks;
identify a plurality of frames included in the sequence of video frames to be decoded in a decoding order different from the display order, wherein none of the plurality of frames comprises video blocks that are dependent on video blocks of another frame of the plurality of frames and wherein the plurality of frames includes at least a first video frame and a second video frame;
define a statistical metric associated with the plurality of video blocks, wherein the statistical metric comprises at least one of an average motion across at least a portion of the sequence of video frames and an average motion across the first and second video frames;
load, from a memory to a cache, predictive data for the plurality of frames based on the statistical metric;
define the decoding order of the video blocks of the identified plurality of frames based at least in part on the statistical metric, wherein the decoding order of the plurality of frames reduces a number of times predictive data is loaded from the memory to the cache, wherein the decoding order defines a spatial order and a temporal order in which the plurality of frames is decoded based on the statistical metric; and
decode the video blocks of the plurality of frames using the predictive data in the cache according to the decoding order, wherein the decoding order identifies at least some video blocks included in the second video frame for decoding before at least some video blocks included in the first video frame, the blocks of the first video frame being further identified for decoding before completely decoding the second video frame, wherein the second video frame occurs after the first video frame in the display order.

30. The computer-readable storage medium of claim 29, wherein the sequence of encoded video frames comprises at least one of:
a sequence of portions of video frames; and
a sequence of slices of video frames.

31. The computer-readable storage medium of claim 29, wherein the decoding order alternates between one or more video blocks of the first encoded video frame and one or more video blocks of the second video frame.

32. The computer-readable storage medium of claim 29, wherein the decoding order is based on a likelihood that the predictive data loaded in the cache is used in decoding the video blocks of the plurality of frames without needing to reload the cache.

33. The computer-readable storage medium of claim 29, wherein the decoding order is defined such that the video blocks of the first video frame are decoded in an order that does not correspond to a raster scan order of the first video frame and the video blocks of the second video frame are decoded in an order that does not correspond to a raster scan order of the second video frame.

34. The computer-readable storage medium of claim 33, wherein at least one video block of a second row of the first video frame is decoded prior to at least one video block of a first row of the first video frame, wherein the second row is below the first row.

35. The computer-readable storage medium of claim 29, wherein the first video frame comprises a first B-frame and the second video frame comprises a second P-frame, and wherein the sequence of video frames follow an IBPBP format including an I-frame, followed by the first B-frame, followed by a first P-frame, followed by a second B-frame, followed by the second P-frame, wherein the identified plurality of frames consist of the first B-frame and the second P-frame.

36. The computer-readable storage medium of claim 29, wherein the first video frame comprises a first B-frame and the second video frame comprises a second P-frame, and wherein the sequence of video frames follow an IBBPBBP format including an I-frame, followed by the first B-frame, followed by a second B-frame, followed by a first P-frame, followed by a third B-frame, followed by a fourth B-frame, followed by the second P-frame, wherein the identified plurality of frames consist of the first B-frame, the second B-frame and the second P-frame.

* * * * *